US008289003B2

(12) United States Patent
Motoyama

(10) Patent No.: US 8,289,003 B2
(45) Date of Patent: Oct. 16, 2012

(54) DISCHARGE APPARATUS, METHOD OF CONTROLLING DISCHARGE APPARATUS, AND IMAGING APPARATUS

(75) Inventor: Shigeki Motoyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 637 days.

(21) Appl. No.: 12/417,233

(22) Filed: Apr. 2, 2009

(65) Prior Publication Data

US 2009/0261788 A1 Oct. 22, 2009

(30) Foreign Application Priority Data

Apr. 17, 2008 (JP) ................................ 2008-107985

(51) Int. Cl.
*H02J 7/00* (2006.01)
*H02J 7/04* (2006.01)
*H02J 7/16* (2006.01)

(52) U.S. Cl. ........ 320/166; 320/167; 320/150; 320/153; 320/154

(58) Field of Classification Search .................. 320/166, 320/167
See application file for complete search history.

(56) References Cited

U.S. PATENT DOCUMENTS 4,302,707 A * 11/1981 Hattori ....................... 315/241 P
5,023,516 A * 6/1991 Ito et al. ........................ 315/101
7,427,838 B2 9/2008 Hosoya

FOREIGN PATENT DOCUMENTS

JP 59-175596 10/1984
JP 60-194727 10/1985
JP 3-110795 5/1991
JP 5-114493 5/1993
JP 9-162003 6/1997
JP 9-190887 7/1997
JP 10162788 A * 6/1998
JP 2000-173789 6/2000
JP 2001-28437 1/2001
JP 2001-350183 12/2001
JP 2002-151741 5/2002
JP 2005-310571 11/2005

* cited by examiner

*Primary Examiner* — Edward Tso
*Assistant Examiner* — Ahmed Omar
(74) *Attorney, Agent, or Firm* — Oblon, Spivak, McClelland, Maier & Neustadt, L.L.P.

(57) ABSTRACT

A discharge apparatus includes a discharge device having a temperature characteristic in which the impedance of the discharge device in a discharging state decreases as the ambient temperature increases, a capacitor that stores charge for causing the discharge device to discharge, a discharge control device that controls electrical connection and disconnection between the capacitor and the discharge device, and a current limiting device that limits a current flowing in the discharge control device to a predetermined value or less when the discharge control device electrically connects the capacitor to the discharge device. The current limiting device is serially connected to the discharge device, the capacitor, and the discharge control device. The current limiting device is a thermistor having a temperature characteristic in which the resistance of the thermistor increases as the temperature of the thermistor increases.

7 Claims, 4 Drawing Sheets

DISCHARGE APPARATUS, METHOD OF CONTROLLING DISCHARGE APPARATUS, AND IMAGING APPARATUS

BACKGROUND OF THE INVENTION

1. Field of the Invention

The present invention relates to a discharge apparatus for causing a discharge device to discharge, a method of controlling the discharge apparatus, and an imaging apparatus that includes the discharge apparatus as a flash apparatus for illuminating an object.

2. Description of the Related Art

In imaging apparatuses such as digital still cameras, a flash apparatus used as an auxiliary light source for photographing in the dark includes, for example, a discharge tube filled with xenon gas, a capacitor for storing charge for causing the discharge tube to discharge, and a discharge control device that controls electrical connection and disconnection between the capacitor and the discharge tube. The discharge tube is caused to discharge to generate a flash of light for external illumination.

In such a flash apparatus, when the discharge tube enters a discharging state, its impedance rapidly decreases, causing a large momentary discharge current to flow in the circuit. The large current may damage the discharge control device that controls electrical connection and disconnection between the capacitor and the charge tube. In addition, when the ambient temperature of the discharge tube increases, the discharge tube will more easily discharge. Hence, compared with the case of normal temperature, even a larger discharge current will flow in the circuit during discharging, and may damage the discharge control device that controls electrical connection and disconnection between the capacitor and the charge tube.

Japanese Unexamined Patent Application Publication No. 2005-310571 discloses a portable electronic apparatus having a camera function, where in order to prevent the ambient temperature of a lighting device from abnormally increasing, the portable electronic apparatus has a thermistor that senses the ambient temperature of the lighting device. When the portable electronic apparatus detects an abnormal condition, it stops supply of power to the lighting device.

SUMMARY OF THE INVENTION

The technology described in Japanese Unexamined Patent Application Publication No. 2005-310571, will not allow a lighting operation to be performed when the ambient temperature of the lighting device becomes high, since it is determined that an abnormal condition has occurred. Likewise, the above technology, when applied to a discharge circuit for generating a flash of light by discharging a discharge tube, will not allow a discharge operation to be performed when the ambient temperature of the discharge tube increases, since the thermistor determines that an abnormal condition has occurred.

In consideration of such problems, it is desirable to provide a discharge apparatus that causes a discharge device to perform a discharge operation while preventing a discharge control device from being damaged even when the impedance characteristic of the discharge device in a discharging state changes, a method of controlling the discharge apparatus, and an imaging apparatus that includes the discharge apparatus as a flash apparatus.

A discharge apparatus according to an embodiment of the present invention includes a discharge device having a temperature characteristic in which the impedance of the discharge device in a discharging state decreases as the ambient temperature of the discharge device increases, a capacitor that stores charge for causing the discharge device to discharge, a discharge control device that controls electrical connection and disconnection between the capacitor and the discharge device, and a current limiting device that limits a current flowing in the discharge control device to a predetermined value or less when the discharge control device electrically connects the capacitor to the discharge device. The current limiting device is serially connected to the discharge device, the capacitor, and the discharge control device. The current limiting device is a thermistor having a temperature characteristic in which the resistance of the thermistor increases as the temperature of the thermistor increases.

A method of controlling a discharge apparatus according to an embodiment of the present invention includes the step of limiting, by using a resistor, a current that flows in a discharge control device to a predetermined value or less when the discharge control device electrically connects a capacitor to a discharge device. The capacitor stores charge for causing the discharge device to discharge, and the discharge control device controls electrical connection and disconnection between the capacitor and the discharge device. The discharge device has a temperature characteristic in which the impedance of the discharge device in a discharging state decreases as the ambient temperature of the discharge device increases. The resistor is serially connected to a discharge circuit including the discharge device, the capacitor, and the discharge control device, and the resistor is a thermistor having a temperature characteristic in which the resistance of the thermistor increases as the temperature of the thermistor increases.

An imaging apparatus according to an embodiment of the present invention includes a flash apparatus used for illuminating an object. The flash apparatus includes a discharge device having a temperature characteristic in which the impedance of the discharge device in a discharging state decreases as the ambient temperature of the discharge device increases and generating light when entering the discharging state, a capacitor that stores charge for causing the discharge device to discharge, a discharge control device that controls electrical connection and disconnection between the capacitor and the discharge device, and a current limiting device that limits a current flowing in the discharge control device to a predetermined value or less when the discharge control device electrically connects the capacitor to the discharge device. The current limiting device is serially connected to the discharge device, the capacitor, and the discharge control device. The current limiting device is a thermistor having a temperature characteristic in which the resistance of the thermistor increases as the temperature of the thermistor increases.

According to an embodiment of the present invention, since a current that flows in a discharge control device is limited to a predetermined value or less when the discharge control device electrically connects a capacitor to a discharge device, by using a thermistor having a temperature characteristic in which the resistance of the thermistor increases as the temperature of the thermistor increases, a discharge operation is possible while preventing the discharge control device from being damaged even when the impedance characteristic of the discharge device in a discharging state changes.

DESCRIPTION OF THE PREFERRED EMBODIMENTS

Figure 1:
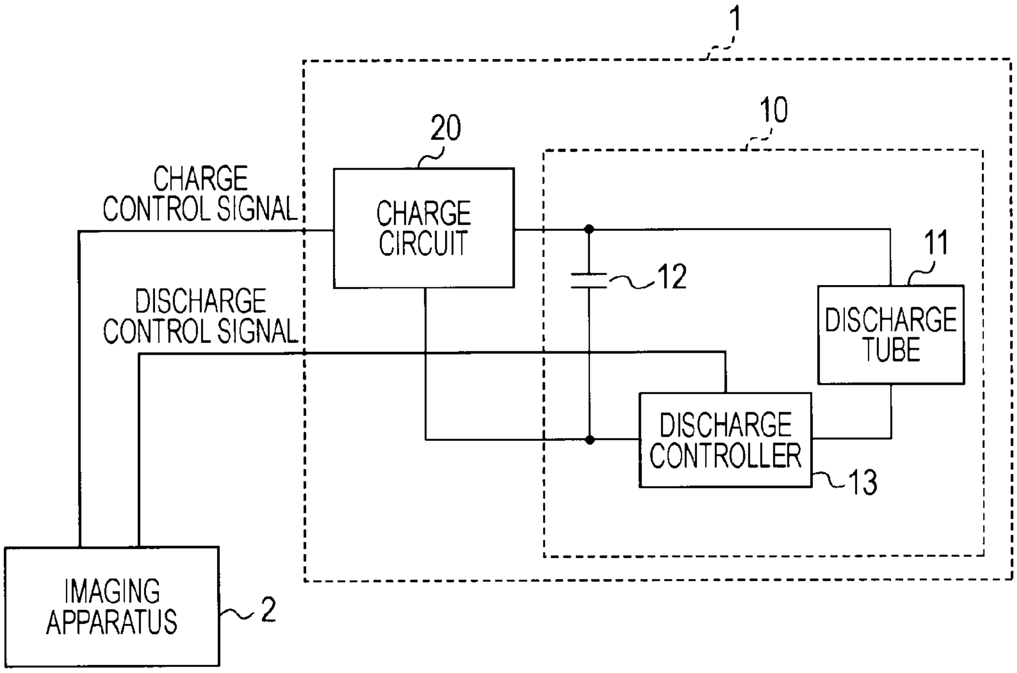
FIG. 1 is a block diagram showing a general configuration of a strobe flash apparatus 1 that includes a built-in discharge apparatus according to an embodiment of the present invention.

A discharge apparatus according to an embodiment of the present invention is an apparatus that causes a discharge device, such as a discharge tube, to be in a discharging state. Referring to FIG. 1, a preferred embodiment will be described below using, as an example, a strobe flash apparatus 1 into which the discharge apparatus is built.

The strobe flash apparatus 1 is an apparatus that produces a flash of light to illuminate an object being photographed using an imaging apparatus 2 such as a digital still camera.

In other words, the strobe flash apparatus 1 is a flash apparatus removably connected to the imaging apparatus 2, and includes a discharge circuit 10 for performing a discharge operation, and a charge circuit 20 for performing a charging operation. Note that the strobe flash apparatus 1 may be configured so as to be built into the imaging apparatus 2.

Referring to FIG. 1, the discharge circuit 10 includes a discharge tube 11 filled with a gas, such as xenon, that emits a flash of light during discharging, a capacitor 12 that stores charge for causing the discharge tube 11 to discharge, and a discharge controller 13 that controls a discharge operation performed by the discharge tube 11.

The charge circuit 20 is electrically connected to the capacitor 12 of the discharge circuit 10, and performs a charging operation to store charge in the capacitor 12 under the control of a charge control signal provided from the imaging apparatus 2. For instance, the charge circuit 20 receives power from the imaging apparatus 2, raises the voltage of the power, and applies this raised voltage to the capacitor 12, through a rectifier (not shown), thereby charging the capacitor 12.

Note that the strobe flash apparatus 1 may be configured so as to contain a battery or the like thereby causing the charge circuit 20 to charge the capacitor 12, instead of receiving power from the imaging apparatus 2 as described above.

Figure 2:
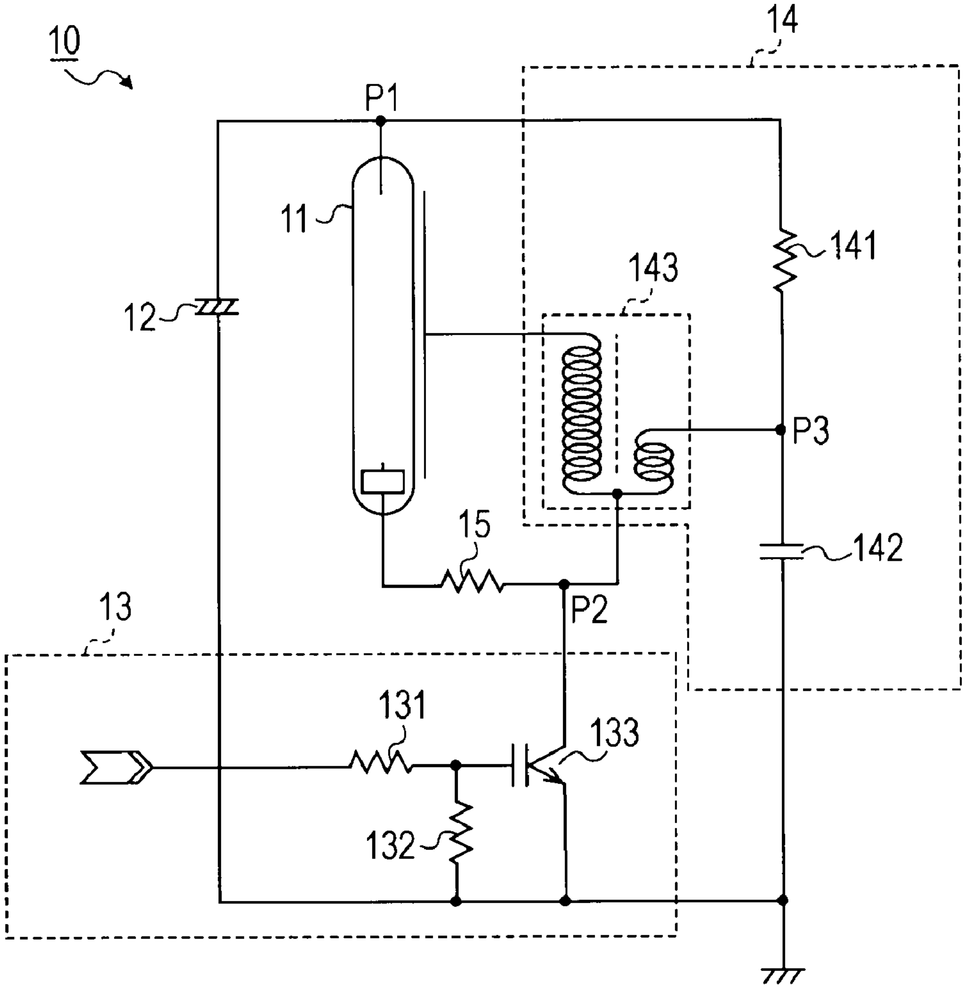
FIG. 2 is a circuit diagram for explaining a specific circuit configuration of a discharge circuit.

Referring to FIG. 2, a specific circuit configuration of the discharge circuit 10 will now be described in detail.

The discharge circuit 10, which includes the discharge tube 11, the capacitor 12 and the discharge controller 13 described above, also includes a trigger circuit 14 for causing the discharge tube 11 to start discharging in a state where a voltage is applied thereto by the capacitor 12, and a thermistor 15 that limits a current flowing from the discharge tube 11 to the discharge controller 13 during discharging.

In the discharge circuit 10, the capacitor 12 is connected to the discharge tube 11 and the trigger circuit 14 via a branch node P1; and the trigger circuit 14 and the thermistor 15 that is connected to the cathode of the discharge tube 11 are connected to each other via a branch node P2.

The discharge tube 11, which is filled with a gas such as xenon, that emits a flash of light during discharging, is caused by the trigger circuit 14 to start discharging, after a discharge voltage has been applied to the discharge tube 11 from the capacitor 12 under the control of the discharge controller 13. Thus, the discharge tube 11 enters a state of emitting light through discharging, functioning as a discharge light emitting device that illuminates an object with a flash of light.

The capacitor 12, after charge is stored therein by the charging operation of the charge circuit 20 described above, applies a discharge voltage to the discharge tube 11 when the branch node P2 is short-circuited to the ground by the discharge controller 13.

The discharge controller 13 includes serially connected resistors 131 and 132, and a switching transistor 133.

An insulated gate bipolar transistor (IGBT), for example, is used as the transistor 133 in the discharge controller 13. The transistor 133 functions as a discharge control device that controls electrical connection and disconnection between the capacitor 12 and the discharge tube 11. To perform this control, the collector is connected to the thermistor 15 and the trigger circuit 14 via the branch node P2, the base is connected to the resistor 131, and the emitter is connected to the ground, specifically.

When a discharge control signal is high, the discharge controller 13 makes the trigger circuit 14 described later operate, through the transistor 133 being turned on, thereby causing the discharge tube 11 to start discharging. When the discharge control signal becomes low after the discharge tube 11 has started discharging and emitting light, the discharge controller 13 causes, through the transistor 133 being turned off, a current to stop flowing from the capacitor 12 into the discharge tube 11, thereby causing the discharging to be terminated.

The trigger circuit 14 is a circuit used for causing the discharge tube 11, to which a discharge voltage from the capacitor 12 is applied, to start discharging. The trigger circuit 14 includes a resistor 141, a capacitor 142, and a transformer 143.

In the trigger circuit 14, the branch node P1 is connected to the ground through the resistor 141 and then through the capacitor 142; the primary coil of the transformer 143 is connected to the branch node P2 and a connection node P3 between the resistor 141 and the capacitor 142; and the secondary coil of the transformer 143 is connected to the discharge tube 11 and the branch node P2.

Through the above-described transistor 133 being turned on, the trigger circuit 14 causes a current to flow from the capacitor 142 into the primary coil of the transformer 143, and applies a voltage generated in the secondary coil of the transformer 143 to the discharge tube 11, there by causing the discharge tube 11 to start discharging.

The thermistor 15 is a resistor, which is used to prevent the transistor 133 from being damaged due to an excessive current flowing between the collector and the emitter of the transistor 133. The thermistor 15 is connected between the cathode of the discharge tube 11 and, via the branch node P2, the collector of the transistor 133. In other words, the thermistor 15 limits the current flowing between the collector and the emitter of the transistor 133 to a predetermined value or less when the transistor 133 is turned on and the capacitor 12 is electrically connected to the discharge tube 11, thereby starting a discharge operation. For instance, when the peak current rating of the transistor 133 is 150 A, the thermistor 15 limits the current flowing between the collector and the emitter of the transistor 133 to 150 A or less when a discharge operation is started.

A thermistor used as the thermistor 15 satisfies, for example, the following design guideline.

When a discharge operation starts, the impedance of the discharge tube 11 rapidly decreases, and hence, a large momentary discharge current will flow through the branch node P2 and the transistor 133 to the ground.

In the case of high temperature where the discharge tube 11 is repeatedly discharging, compared with the case of normal temperature where the discharge tube 11 is not discharging repeatedly, the gas filled in the discharge tube 11 is in a state where it is more likely to be excited than at normal temperature. In other words, the discharge tube 11 at high temperature is in a state where it is more likely to discharge than at normal temperature. Hence, the discharge tube 11 has a characteristic that, as the temperature at which a discharge operation is started increases, the impedance will decrease more rapidly.

Figure 3A:
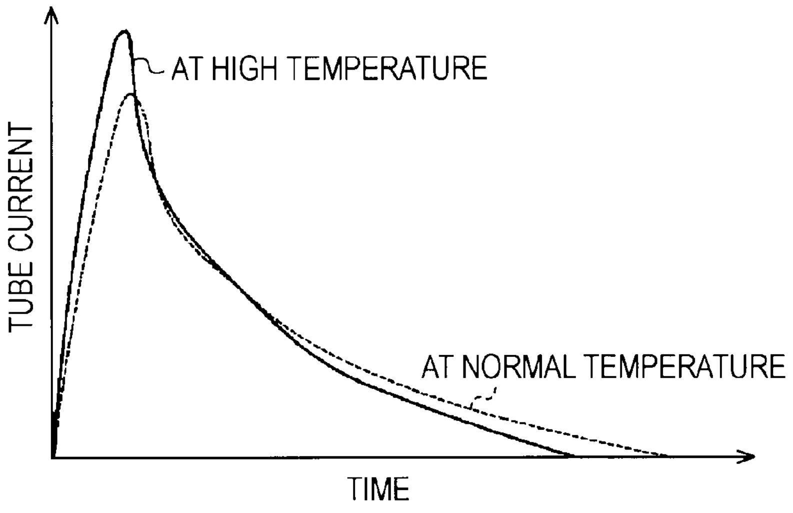
FIGS. 3A and 3B are graphs showing time responses of discharge currents in discharge operations.

For instance, referring to FIG. 3A, when a discharge operation is started by a discharge circuit that does not include the thermistor 15, the rising portion of a discharge current right after the start of the discharge operation performed at high temperature is higher than at low temperature, causing an excessive current to flow in the transistor 133. Note that in FIG. 3A, a solid line shows a time response of a tube current at high temperature, and a dotted line shows a time response of the tube current at normal temperature.

Hence, in the discharge circuit 10, on the basis of a design guideline to make the overall impedance of a discharge-current flowing path substantially constant, the thermistor 15 connected at a certain point on the discharge-current flowing path is chosen to be a positive temperature coefficient (PTC) thermistor having a characteristic in which the resistance increases as temperature increases.

The design guideline described above can be formulated as follows, for example:

$$ICM \geqq Itrip$$

$$RPTC(\text{holding state}) \ll Rtube$$

$$RPTC(\text{trip state}) \approx Rtube$$

Here, ICM represents the peak current rating of the transistor 133, Itrip represents a transition current when the thermistor 15 is in a trip state where its resistance has been rapidly increased due to heat generation, RPTC (holding state) represents the resistance of the thermistor 15 at low temperature, RPTC (trip state) represents the resistance of the thermistor 15 in the trip state, and Rtube represents the pseudo-resistance of the discharge tube 11 during discharging.

In the discharge circuit 10, by using the thermistor 15 having the temperature characteristic described above, even when the impedance of the discharge tube 11 decreases due to a start of a discharge operation, the resistance of the thermistor 15 increases due to self heat generation caused by a current flowing in the thermistor 15, thereby suppressing the increase in the discharge current. Hence, the current flowing between the collector and the emitter of the transistor 133 is limited to a predetermined value or less, thereby preventing damage.

Figure 3B:
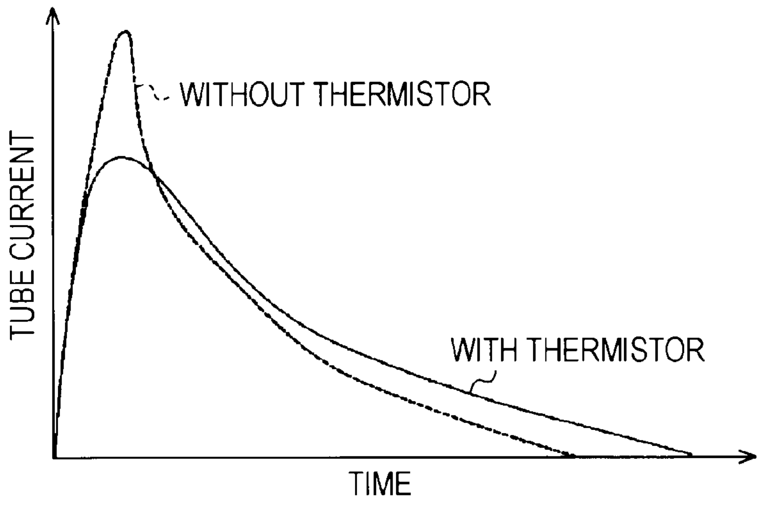

For instance, even when the discharge tube 11 has entered a high temperature state due to repeated discharge operations, the discharge circuit 10 can suppress an excessively large rise in the discharge current as shown in FIG. 3B. In FIG. 3B, a solid line shows a time response of the discharge current for the case where the discharge circuit 10 having the thermistor 15 has started a discharge operation of the discharge tube in a high temperature state; and a dotted line shows a time response of the discharge current for the case where the discharge circuit 10 that does not have the thermistor 15 has started a discharge operation of the discharge tube in a high temperature state.

Thus the discharge circuit 10, when the transistor 133 electrically connects the capacitor 12 and the discharge tube 11, limits the current flowing in the transistor 133 to a predetermined value or less using the thermistor 15 connected serially to the discharge tube 11, the capacitor 12, and the transistor 133. Hence, a discharge operation can be performed while preventing possible damage to the transistor 133 even when the impedance characteristic of the discharge tube 11 in a discharging state changes.

Figure 4:
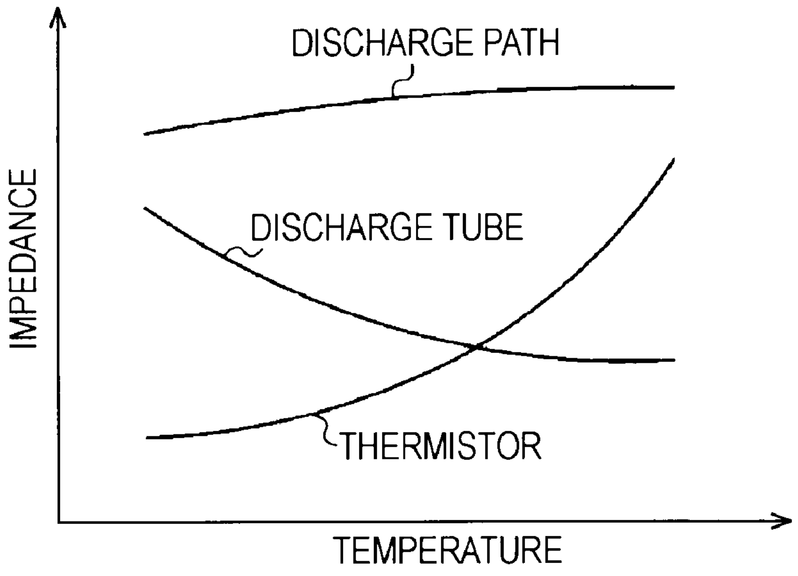
FIG. 4 is a graph for explaining temperature characteristics of various portions of the discharge circuit.

It is not necessary to connect the thermistor 15 at the position shown in FIG. 2, as long as the thermistor 15 is connected serially to the capacitor 12 and the transistor 133, i.e., at a certain point on a path through which a current flows from the discharge tube 11 to the transistor 133 due to a discharge operation. However, by connecting the thermistor 15 at a position near the discharge tube 11, the temperature characteristic of the thermistor 15 can be designed so as to cancel out a decrease in the impedance of the discharge tube 11 due to its increased ambient temperature, as shown in FIG. 4, thereby limiting the current flowing between the collector and the emitter of the transistor 133 to a predetermined value or less.

For ordinary measurement of temperature, a thermistor is usually used whose resistance linearly changes in accordance with the ambient temperature. The thermistor 15 according to the present embodiment, however, has a nonlinear temperature characteristic in which the rate of increase of resistance increases with the ambient temperature due to self heat generation caused by a current flowing in the thermistor 15. This characteristic of the thermistor 15 is desirable due to the following reasons.

First, the discharge tube 11 has a nonlinear temperature characteristic in which the rate of decrease of impedance in a discharging state increases as the ambient temperature increases. In order to cancel out this decrease in impedance due to the temperature characteristic, the thermistor 15 is designed such that the overall impedance of the discharge-current flowing path is kept substantially constant.

Second, if a thermistor having a linear temperature characteristic is used, although the above-described rise of a discharge current at the start of a discharge operation can be suppressed as well, the resistance of the thermistor remains high even when the discharge current becomes relatively small. Hence, the discharge current rapidly converges to zero, making it difficult to realize a desired discharge operation.

As the length of the discharge tube becomes smaller, the impedance of the discharge tube in a discharging state decreases. Also in this case, by using the discharge circuit 10 according to the present embodiment, a discharge current flowing in the circuit during a discharge operation can be suppressed by the thermistor 15. Hence, even when a discharge tube having a relatively small length is used, the discharge circuit 10 allows the discharge tube 11 to discharge while preventing damage to the transistor 133, thereby realizing reduction in the size of the circuit.

The present application contains subject matter related to that disclosed in Japanese Priority Patent Application JP 2008-107985 filed in the Japan Patent Office on Apr. 17, 2008, the entire content of which is hereby incorporated by reference.

The present invention is not limited to the above embodiments, and various modifications may occur insofar as they are within the scope of the present invention.

What is claimed is:

1. A discharge apparatus comprising:

a discharge device having a temperature characteristic in which impedance of the discharge device in a discharging state decreases as ambient temperature of the discharge device increases;

a capacitor that stores charge for causing the discharge device to discharge;

a discharge control device that controls electrical connection and disconnection between the capacitor and the discharge device; and a current limiting device that limits a current flowing in the discharge control device to a predetermined value or less when the discharge control device electrically connects the capacitor to the discharge device, the current limiting device being serially connected to the discharge device, the capacitor, and the discharge control device, such that the current limiting device is provided between the discharge control device and one end of the discharge device, and the capacitor is provided between the discharge control device and an other end of the discharge device, wherein the current limiting device is a thermistor having a temperature characteristic in which resistance of the thermistor increases as temperature of the thermistor increases.

2. The discharge apparatus according to claim 1, wherein the current limiting device is a thermistor that has a nonlinear temperature characteristic in which the rate of increase of the resistance of the thermistor increases as the temperature of the thermistor increases.

3. The discharge apparatus according to claim 2, wherein the current limiting device is a thermistor that has a nonlinear temperature characteristic in which the rate of increase of the resistance of the thermistor increases as the temperature of the thermistor increases due to self heat generation caused by a current flowing in the thermistor.

4. The discharge apparatus according to claim 1, wherein the current limiting device is arranged in the vicinity of the discharge device, and the current limiting device is a thermistor having a temperature characteristic in which the resistance of the thermistor increases as the ambient temperature of the thermistor increases due to heat generation of the discharge device.

5. The discharge apparatus according to claim 1, wherein the discharge device is a discharge light emitting device that generates light when entering a discharging state.

6. A method of controlling a discharge apparatus comprising:

limiting, by a resistor, a current that flows in a discharge control device to a predetermined value or less when the discharge control device electrically connects a capacitor to a discharge device, wherein the capacitor stores charge for causing the discharge device to discharge, and the discharge control device controls electrical connection and disconnection between the capacitor and the discharge device, the discharge device has a temperature characteristic in which impedance of the discharge device in a discharging state decreases as ambient temperature of the discharge device increases, the resistor is serially connected to a discharge circuit including the discharge device, the capacitor, and the discharge control device, such that the resistor is provided between the discharge control device and one end of the discharge device, and the capacitor is provided between the discharge control device and an other end of the discharge device, and the resistor is a thermistor having a temperature characteristic in which resistance of the thermistor increases as temperature of the thermistor increases.

7. An imaging apparatus comprising:

a flash apparatus used for illuminating an object, including:

a discharge device having a temperature characteristic in which impedance of the discharge device in a discharging state decreases as ambient temperature of the discharge device increases and generating light when entering the discharging state, a capacitor that stores charge for causing the discharge device to discharge, a discharge control device that controls electrical connection and disconnection between the capacitor and the discharge device, and a current limiting device that limits a current flowing in the discharge control device to a predetermined value or less when the discharge control device electrically connects the capacitor to the discharge device, the current limiting device being serially connected to the discharge device, the capacitor, and the discharge control device, such that the current limiting device is provided between the discharge control device and one end of the discharge device, and the capacitor is provided between the discharge control device and an other end of the discharge device, wherein the current limiting device is a thermistor having a temperature characteristic in which resistance of the thermistor increases as temperature of the thermistor increases.

* * * * *